US005335367A

United States Patent [19]

Adachi et al.

[11] Patent Number: 5,335,367

[45] Date of Patent: Aug. 2, 1994

[54] ANTENNA RETRACTING STRUCTURE OF PORTABLE RADIO

[75] Inventors: Naotomo Adachi; Tetsuya Kubo; Ryoichi Kaiwa; Michiyoshi Kudoh, all of Yokohama, Japan

[73] Assignee: Matsushita Electric Industrial Co., Ltd., Osaka, Japan

[21] Appl. No.: 846,145

[22] Filed: Mar. 5, 1992

[30] Foreign Application Priority Data

Mar. 11, 1991 [JP] Japan ................................. 3-044789

[51] Int. Cl.$^5$ ....................... H04B 1/38; H04B 1/034; H04B 1/18; H01Q 1/24

[52] U.S. Cl. ........................................ 455/90; 455/97; 455/280; 455/351; 379/58; 343/702

[58] Field of Search .................. 455/89, 90, 128, 269, 455/54.1, 54.2, 269, 280, 289, 347, 348, 351, 97, 129; 379/58, 59, 60, 63; 343/702, 901, 883

[56] References Cited

U.S. PATENT DOCUMENTS 4,725,845 2/1988 Phillips ................................ 343/702
5,014,346 5/1991 Phillips et al. ..................... 455/280
5,148,471 9/1992 Metroka et al. ...................... 379/58
5,151,946 9/1992 Martensson .......................... 379/59
5,166,695 11/1992 Chan et al. .......................... 343/702
5,177,492 1/1993 Tomura et al. ...................... 343/702

FOREIGN PATENT DOCUMENTS 56-123648 9/1981 Japan .
60-40005 12/1985 Japan .
2209248 5/1989 United Kingdom .

*Primary Examiner*—Reinhard J. Eisenzopf
*Assistant Examiner*—Lisa Charouel
*Attorney, Agent, or Firm*—Stevens, Davis, Miller & Mosher

[57] ABSTRACT

A portable radio provided with a slidable antenna retractably supported by a housing, an antenna operating member movably mounted in the housing for projecting an antenna top portion from the housing by sliding the antenna in a first direction toward the outside of the housing or for releasing the antenna to enable the antenna to slide in a retracting direction opposite to the first direction, and an operating portion for operating the antenna operating member from outside the housing.

7 Claims, 2 Drawing Sheets

ANTENNA RETRACTING STRUCTURE OF PORTABLE RADIO

BACKGROUND OF THE INVENTION

1. Field of the Invention

The present invention relates to an antenna retracting structure of a portable radio, such as a portable telephone and an inter-call radio.

2. Description of the Related Art

In a well-known type of portable telephone, as disclosed in, for example, Japanese Utility Model Publication No. 60-40005, a slidable antenna is retractably supported by a housing. The antenna is projected from the housing in operation and retracted into the housing in non-operation so as to be prevented from being damaged when the telephone falls or collides with another object. Furthermore, for example, Japanese Utility Model Application No. 55-22569 discloses another structure in which a cover is movably connected to a housing of a telephone body. When the telephone is not used, the cover is closed to protect push buttons, a receive button and so on of the telephone body, and when the telephone is used, the cover is opened to expose the above buttons.

However, with recent miniaturization of a portable telephone, an antenna has been downsized and thus an antenna top has been also small. Therefore, if the antenna is put into the housing when the telephone is not used in the same manner as the above prior art, it is difficult to pinch the antenna top and troublesome to extend the antenna. In order to solve this problem, it is possible that the antenna is protected by being retracted in an outer portion of the housing, an opening is formed on the housing corresponding to the antenna top, and the antenna is projected by engaging a nail or the like and the antenna top through the opening. In this case, however, it is impossible to promptly extend the antenna and to speak by the telephone immediately after a call is received.

On the other hand, in the case where the cover is provided, since it is necessary to open the cover in call reception and to press a receive button besides the above operation of extending the antenna, operability is poor and immediate response is not possible.

SUMMARY OF THE INVENTION

The present invention aims to solve the above problems of the prior art. An object of the present invention is to provide a portable radio capable of retracting an antenna in a housing in non-operation to prevent the antenna from being damaged and of easily extending the antenna in operation to enhance operability and increase response speed. Another object of the present invention is to provide a portable radio capable of further enhancing operability and increasing response speed in addition to the above object.

In order to achieve the above objects, there is provided a mechanical solving means comprising a slidable antenna retractably supported by a housing, an antenna operating member movably mounted in the housing for projecting an antenna top portion from the housing by sliding the antenna in the use direction or for releasing the antenna to be capable of sliding in the non-use direction, and an operating portion for operating the antenna operating member from outside the housing.

It is preferable that the antenna operating member and the operating portion are urged by a spring so as to return in the non-use direction.

The mechanical solving means having the above operating portion and the antenna operating member further comprises a receive switch disposed in the housing, and a switch operating member for actuating the receive switch in correlation to the sliding movement of the operating portion and the antenna operating member in the use direction and releasing the receive switch in correlation to the sliding movement of the operating portion and the antenna operating member in the non-use direction.

It is preferable that the switch operating member, the antenna operating member and the operating portion are urged by a spring to return in the non-use direction.

The mechanical solving means having the above operating portion and the antenna operating member further comprises a cover openably connected to the housing and having a first engaging portion for locking, and a second engaging portion for locking which releases the cover by disengaging from the first engaging portion in correlation to the slide of the operating portion and the antenna operating member in the use direction and retracts the cover to a closing position by engaging the first engaging portion in correlation to the sliding movement of the operating portion and the antenna operating member in the non-use direction.

It is preferable that the second engaging portion, the antenna operating member and the operating portion are urged by a spring to return in the non-use direction.

The mechanical solving means having the above operating portion and the antenna operating member further comprises a receive switch disposed in the housing, a switch operating member for actuating the receive switch in correlation to the sliding movement of the operating portion and the antenna operating member in the use direction and for releasing the receive switch in correlation to the sliding movement of the operating portion and the antenna operating member in the non-use direction, a cover openably connected to the housing and having a first engaging portion for locking, and a second engaging portion for locking which releases the cover by disengaging from the first engaging portion in correlation to the sliding movement of the operating portion and the antenna operating member in the use direction and retracts the cover to a closing position by engaging the first engaging portion in correlation to the sliding movement of the operating portion and the antenna operating member in the non-use direction.

It is preferable that the second engaging portion, the switch operating member, the antenna operating member and the operating portion are urged by a spring to return in the non-use direction.

Therefore, according to the present invention, the antenna can be retracted in the housing in non-operation. In operation, the antenna operating member is operated in correlation to the sliding movement of the operating portion in the use direction, thereby sliding the antenna and projecting the antenna top portion outside the housing. Accordingly, the antenna can be easily projected by pinching the antenna top portion.

If a receive switch is provided, it is possible to project the antenna top portion outside the housing as described above, and to actuate the receive switch in correlation to the switch operating member by sliding the operating portion in the use direction in operation.

If a cover is provided, it is possible to project the antenna top portion outside the housing as described above, and to release the cover from the first locking engaging portion of the cover in correlation to the second locking engaging portion by sliding the operating portion in the use direction in operation.

If a receive switch and a cover are both provided, it is possible to project the antenna top portion outside the housing as described above, and to actuate the receive switch, and to release the cover by sliding the operating portion in the use direction in operation.

DESCRIPTION OF PREFERRED EMBODIMENT

An embodiment of the present invention will now be described with reference to the accompanying drawings.

Figure 1:
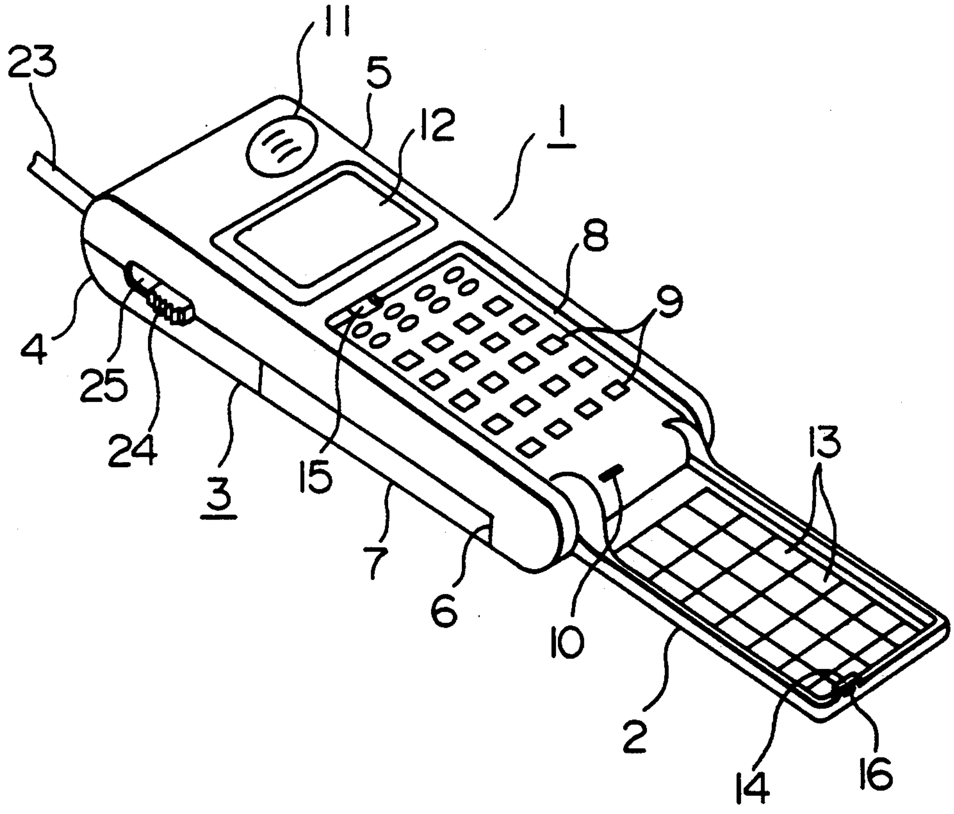
FIG. 1 is a perspective view showing a portable radio according to an embodiment of the present invention in a state in which a cover is open.
Figure 2A:
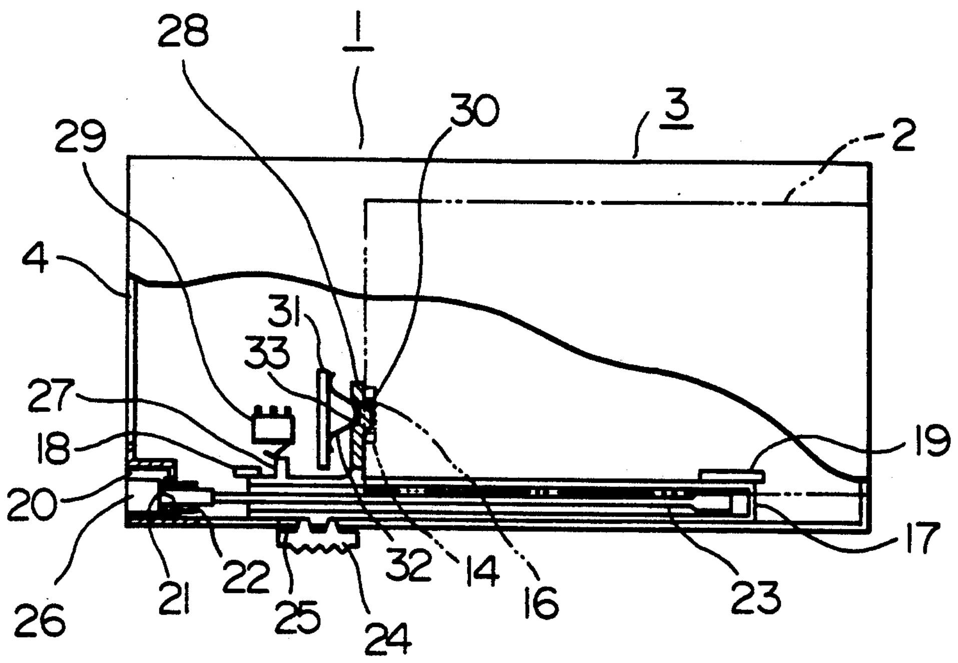
FIG. 2A is a partially cutaway plan view showing a portable radio of the present invention in a state in which the cover is closed.
Figure 2B:
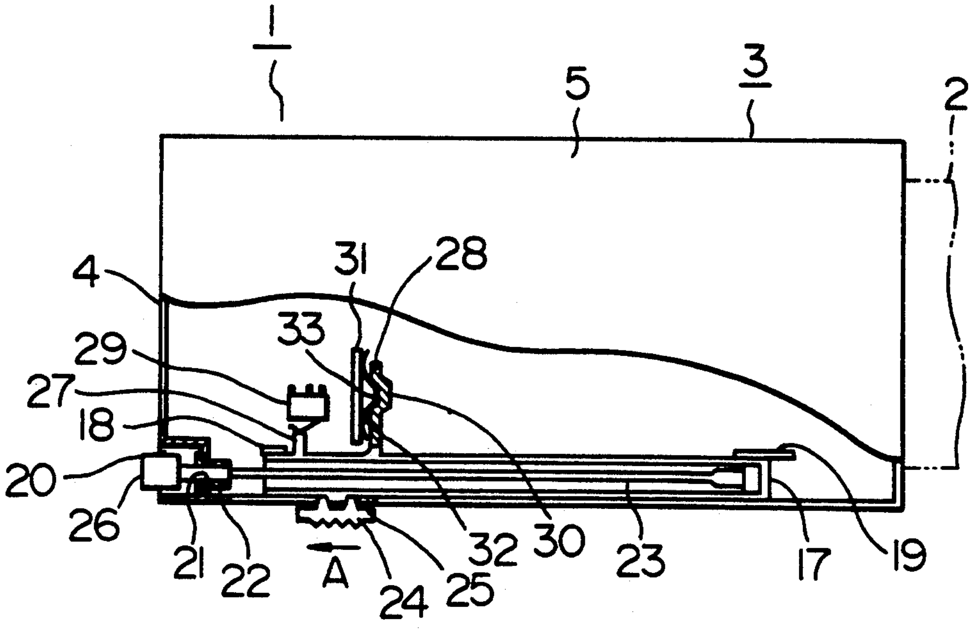
FIG. 2B is a partially cutaway plan view showing the portable radio of FIG. 2A in a state in which the cover is open.

This embodiment is applied to a portable telephone. As shown in FIGS. 1, 2A and 2B, the portable telephone is composed of a telephone body 1 and a cover 2. A housing 3 of the telephone body 1 is composed of a housing body 4 and a lid 5. A battery pack 7 is detachably fitted in a concave portion 6 formed over a range from the center to the lower portion of the back of the housing body 4. A shallow concave portion 8 is formed over a range from the center to the lower portion of the front of the lid 5. Various kinds of push buttons 9 are arranged in the concave portion 8, and a hole 10 for a microphone is formed at the bottom of the concave portion 8. A hole 11 for a speaker is formed in the upper portion of the front of the lid 5, and a display portion (LCD) 12 for data display is disposed below the hole 11. Flat keys 13 for data input are arranged inside the cover 2, and both sides of the base portion of the cover 2 are rotatably connected to both sides of the bottom of the housing 3 and urged by a torsion spring (not shown) in the opening direction. By rotating the cover 2 against the impact resilience of the torsion spring, it is possible to put the cover 2 in the concave portion 8 of the housing 3 and to cover and protect the push buttons 9 and the flat keys 13. At this time, a projecting portion 14 formed at the leading end of the cover 2 is inserted into the housing 3 through a hole 15 formed at the top of the concave portion 8 of the housing 3. The projecting portion 14 is formed with an engaging hole 16 serving as a first engaging portion for locking.

A frame-like antenna operating men%her 17 which also serves as an antenna guide is disposed on one side in the housing 3, and is slidable along the inside of the housing 3 between guides 18 and 19 in the longitudinal direction of the housing 3, that is, in the vertical direction- A concave portion 20 is formed at the top of the housing 3 corresponding to the antenna operating member 17, and an antenna holder 22 is mounted in a hole 21 formed at the bottom of the concave portion 20. A slidable antenna 23 is slidably passed through the antenna holder 22, and slidably inserted in the antenna operating member 17. An operating portion 24 is slidably projected on the side of the center of the antenna operating member 17 through a hole 25 formed on the side of the housing 3. By sliding the operating portion 24 and the antenna operating member 17 together in the use direction (the direction indicated by an arrow A shown in FIG. 2B) in correlation to the manipulation of the operating portion 24 from outside the housing 3, it is possible to make the antenna operating member 17 press and slide the base portion of the antenna 23 so as to project an antenna top portion 26 above the housing 3, and to return the antenna operating member 17 and the operating portion 24 in the non-use direction (the direction opposite to the A direction shown in FIG. 2B) so as to release the antenna 23. Therefore, the antenna 23 can be retracted and the antenna top portion 26 can be put in the concave portion 20 of the housing 3. A switch operating projection 27 and a locking plate 28 are integrally formed on the side of the antenna operating member 17 opposite to the operating portion 24, and movable together with the antenna operating member 17 and the operating portion 24. The switch operating projection 27 can actuate a receive switch (microswitch) 29 disposed in the housing 3 when the antenna operating member 17 and the operating portion 24 slide in the use direction as described above, and can release the receive switch 29 when the antenna operating member 17 and the operating portion 24 slide in the non-use direction as described above. The locking plate 28 is formed with an engaging projection 30 as a second engaging portion for locking which can engage the engaging hole 16 of the cover 2. The engaging projection 30 of the locking plate 28 can disengage from the engaging hole 16 of the cover 2 and release the cover 2 when the antenna operating member 17 and the operating portion 24 slide in the use direction as described above, and can return to the engaging position with the engaging hole 16 of the cover 2 when the antenna operating member 17 and the operating portion 24 slide in the non-use direction as described above. A stopper 31 is integrally formed in the housing 3 substantially parallel to the locking plate 28, and a wire spring 32 is spread between the locking plate 28 and the stopper 31. In other words, the central projecting portion of the wire spring 32 is engaged with a concave portion 33 formed on the side of the locking plate 28 opposite to the engaging projection 30, and both sides of the wire spring 32 are in contact with the stopper 31. The locking plate 28, the switch operating projection 27, the antenna operating member 17 and the operating portion 24 are urged by the wire spring 32 to return in the non-use direction. By closing the cover 2 against the impact resilience of the torsion spring and inserting the projection 14 in the housing 3 through the hole 15 as described above, the engaging hole 16 can be forcibly engaged with the engaging projection 30 against the impact resilience of the wire spring 32.

According to the above construction, operations will now be described.

As shown in FIG. 2A, it is assumed that the locking plate 28, the switch operating projection 27, the antenna operating member 17 and the operating portion 24 are urged by the wire spring 32 and returned in the non-use direction, that the cover 2 is closed and the engaging hole 16 engages the engaging projection 30, and that the antenna 23 is set in the housing 3. In this state, even if the portable telephone inadvertently falls or collides with another object, since the whole antenna 23 is contained in the outer portion of the housing 3, it can be prevented from being damaged. As shown in FIG. 2B, the operating portion 24 is pushed in the use direction (the direction of the arrow A) from this state, and the operating portion 24, the antenna operating member 17, the switch operating projection 27 and the locking plate 28 are slid together against the impact resilience of the wire spring 32. In correlation to this sliding movement, the base portion of the antenna 23 is pushed by the antenna operating member 17, the antenna top portion 26 is projected outside the concave portion 20 of the housing 3, the receive switch 29 is actuated by the switch operating projection 27, and the engaging projection 30 of the locking plate 28 is disengaged from the engaging hole 16, thereby opening the cover 2 by the impact resilience of the torsion spring as shown in FIG. 1. The antenna top portion 26 projecting outside is pinched, and the antenna 23 is slid with respect to the antenna holder 22 and the antenna operating member 17 and drawn outward, thereby starting the call enable state. Meanwhile, the operating portion 24, the antenna operating member 17, the switch operating projection 27 and the locking plate 28 are returned in the non-use direction due to the impact resilience of the wire spring 32 by releasing the pressure of the operating portion 24.

After an end button is operated at the end of the call, as described above, the cover 2 is closed against the impact resilience of the torsion spring, and the engaging hole 16 is engaged with the engaging projection 30 against the impact resilience of the wire spring 32. Subsequently, as shown in FIG. 2A, the antenna 23 can be retracted in the outer portion of the housing 3 to stand by for the next use by sliding the antenna 23 with respect to the antenna holder 22 and the antenna operating member 17.

Although the switch operating projection 27 and the locking plate 28 are moved in correlation to the sliding movement of the operating portion 24 and the antenna operating member 17 in the above embodiment, either the switch operating projection 27 or the locking plate 28 may be moved in correlation with the sliding movement of the operating portion 24 and the antenna operating member 17. In a conventional inter-call radio without the receive switch 29 and the cover 2, the switch operating projection 27 and the locking plate 28 are unnecessary. Various changes of design may be made without departing from the fundamental technical ideas of the present invention.

According to the present invention, as described above, since the antenna can be retracted in the housing in non-operation, the antenna can be prevented from being damaged. Furthermore, since it is possible to slide the antenna in correlation to the antenna operating member and to project the antenna top portion outside the housing by sliding-the operating portion in the use direction in operation, the antenna can be readily drawn out by pinching the antenna top portion. Therefore, operability and response speed can be improved.

If a receive switch is mounted, it is possible to project the antenna top portion outside the housing as described above and to actuate the receive switch in correlation to the switch operating member by sliding the operating portion in the use direction in operation. Therefore, operability and response speed can be further improved.

If a cover is mounted, it is possible to project the antenna top portion outside the housing as described above, and to release the cover from the first locking engaging portion of the cover in correlation to the second locking engaging portion by sliding the operating portion in the use direction in operation. Therefore, operability and response speed can be further improved.

If a receive switch and a cover are both provided, it is possible to project the antenna top portion outside the housing as described above, and to actuate the receive switch, and to release the cover by sliding the operating portion in the use direction in operation. Therefore, operability and response speed can be still further improved.

In addition, operability and response speed can be further improved by urging the antenna operating member and the operating portion, or the antenna operating member, the operating portion and either or both of the switch operating member and the second engaging portion by a spring so as to return in the non-use direction.

What is claimed is:

1. A portable radio comprising:
a slidable antenna retractably supported by a housing;
an antenna operating member movably mounted in said housing for projecting an antenna top portion from said housing by sliding said antenna in a first direction toward the outside of said housing or for releasing said antenna to enable said antenna to slide in a retracting direction opposite to said first direction; and
an operating portion for operating said antenna operating member from outside said housing, wherein said antenna operating member and said operating portion are biased by a spring to bias said antenna to retract in the retracting direction.

2. A portable radio comprising:
a slidable antenna retractably supported by a housing;
an antenna operating member movably mounted in said housing for projecting an antenna top portion from said housing by sliding said antenna in a first direction toward the outside of said housing or for releasing said antenna to enable said antenna to slide in a retracting direction opposite to said first direction;
an operating portion for operating said antenna operating member from outside said housing;
a receive switch disposed in said housing; and
a switch operating member for actuating said receive switch in correlation to sliding movement of said operating portion and said antenna operating member in said first direction and for releasing said receive switch in correlation to sliding movement of said operating portion and said antenna operating member in said retracting direction.

3. A portable radio according to claim 2, wherein said switch operating member, said antenna operating member and said operating portion are biased by a spring to bias said antenna to retract in the retracting direction.

4. A portable radio comprising:
a slidable antenna retractably supported by a housing;
an antenna operating member movably mounted in said housing for projecting an antenna top portion from said housing by sliding said antenna in a first direction toward the outside of said housing or for releasing said antenna to enable said antenna to slide in a retracting direction opposite to said first direction;
an operating portion for operating said antenna operating member from outside said housing; and
a cover operably connected to said housing and having a first engaging portion for locking, and a second engaging portion for locking which releases said cover by disengaging from said first engaging portion in correlation to sliding movement of said operating portion and said antenna operating member in said first direction and retracts said cover to a cover closing position by engaging said first engaging portion in correlation to sliding movement of said operating portion and said antenna operating member in said retracting direction.

5. A portable radio according to claim 4, wherein said second engaging portion, said antenna operating member and said operating portion are biased by a spring to bias said antenna to retract in the retracting direction.

6. A portable radio comprising:

a slidable antenna retractably supported by a housing;

an antenna operating member movably mounted in said housing for projecting an antenna top portion from said housing by sliding said antenna in a first direction toward the outside of said housing or for releasing said antenna to enable said antenna to slide in a retracting direction opposite to said first direction;

an operating portion for operating said antenna operating member from outside said housing;

a receive switch disposed in said housing;

a switch operating member for actuating said receive switch in correlation to sliding movement of said operating portion and said antenna operating member in said first direction and for releasing said receive switch in correlation to sliding movement of said operating portion and said antenna operating member in said retracting direction; and a cover openably connected to said housing and having a first engaging portion for locking, and a second engaging portion for locking which releases said cover by disengaging from said first engaging portion in correlation to sliding movement of said operating portion and said antenna operating member in said first direction and retracts the cover to a cover closing position by engaging said first engaging portion in correlation to sliding movement of said operating portion and said antenna operating member in said retracting direction.

7. A portable radio according to claim 6, wherein said second engaging portion, said switch operating member, said antenna operating member and said operating portion are biased by a spring to bias said antenna to retract in the retracting direction.

* * * * *